United States Patent
Tangl et al.

(10) Patent No.: US 7,588,511 B2
(45) Date of Patent: Sep. 15, 2009

(54) DIFFERENTIAL GEAR UNIT WITH CONTROLLABLE TORQUE AND ROTATIONAL SPEED DISTRIBUTION

(75) Inventors: Ferdinand Tangl, Hart Bei Graz (AT); Franz Zoehrer, Kappenberg (AT)

(73) Assignee: Magna Steyr Fährzeugtechnik AG & Co. KG, Graz (AT)

( * ) Notice: Subject to any disclaimer, the term of this patent is extended or adjusted under 35 U.S.C. 154(b) by 250 days.

(21) Appl. No.: 11/662,983

(22) PCT Filed: Sep. 15, 2005

(86) PCT No.: PCT/AT2005/000372

§ 371 (c)(1),
(2), (4) Date: Mar. 14, 2007

(87) PCT Pub. No.: WO2006/029434

PCT Pub. Date: Mar. 23, 2006

(65) Prior Publication Data

US 2008/0064552 A1     Mar. 13, 2008

(30) Foreign Application Priority Data

Sep. 15, 2004    (AT) .............................. GM675/2004

(51) Int. Cl.
*F16H 48/30* (2006.01)
*F16H 3/72* (2006.01)
*F16H 48/06* (2006.01)

(52) U.S. Cl. ............................ 475/150; 475/5; 475/248
(58) Field of Classification Search ...................... 475/5, 475/10, 149, 150, 151, 330, 903, 269, 221, 475/225, 252, 248
See application file for complete search history.

(56) References Cited

U.S. PATENT DOCUMENTS

| 5,387,161 A |   | 2/1995  | Shibahata |
|-------------|---|---------|-----------|
| 5,437,583 A |   | 8/1995  | Shibahata et al. |
| 5,518,463 A | * | 5/1996  | Shibahata et al. ........... 475/220 |
| 7,056,252 B2 | * | 6/2006  | Gumpoltsberger et al. ..... 475/6 |
| 7,311,631 B2 | * | 12/2007 | Kushino ..................... 475/221 |

FOREIGN PATENT DOCUMENTS

| EP | 0 507 137    | 3/1992 |
|----|--------------|--------|
| FR | 2 844 858    | 9/2002 |
| GB | 2 348 253    | 9/2000 |
| WO | WO 03/066363 | 8/2003 |

* cited by examiner

*Primary Examiner*—Roger Pang
(74) *Attorney, Agent, or Firm*—Bachman & LaPointe, P.C.

(57) ABSTRACT

A differential gearing unit with controllable torque and rotational speed distribution, composed of a housing (1), a differential gearing (6), a superposition gearing (7) and an auxiliary drive (8), with the differential gearing (6) comprising an input member (11) which is driven by the vehicle engine, and two output members (15, 16) with output shafts (3, 4), and with the superposition gearing (7) being a planetary gear set which is connected to two members (15, 16) of the differential gearing (6) and to the auxiliary drive (8). In order to provide precise control with a low-power auxiliary drive, the superposition gearing (7) comprises a first (22) and a second (27) sun gear, a first (20) and a second (25) ring gear and first (21) and second (26) planet gears on a common planet carrier (28), with the first (21) and second (26) planet gears meshing in each case with the first (22) and second sun gear (27) respectively and with the first (20) and second ring gear (25) respectively, and with a ring gear being rotationally fixedly connected to an output shaft.

8 Claims, 2 Drawing Sheets

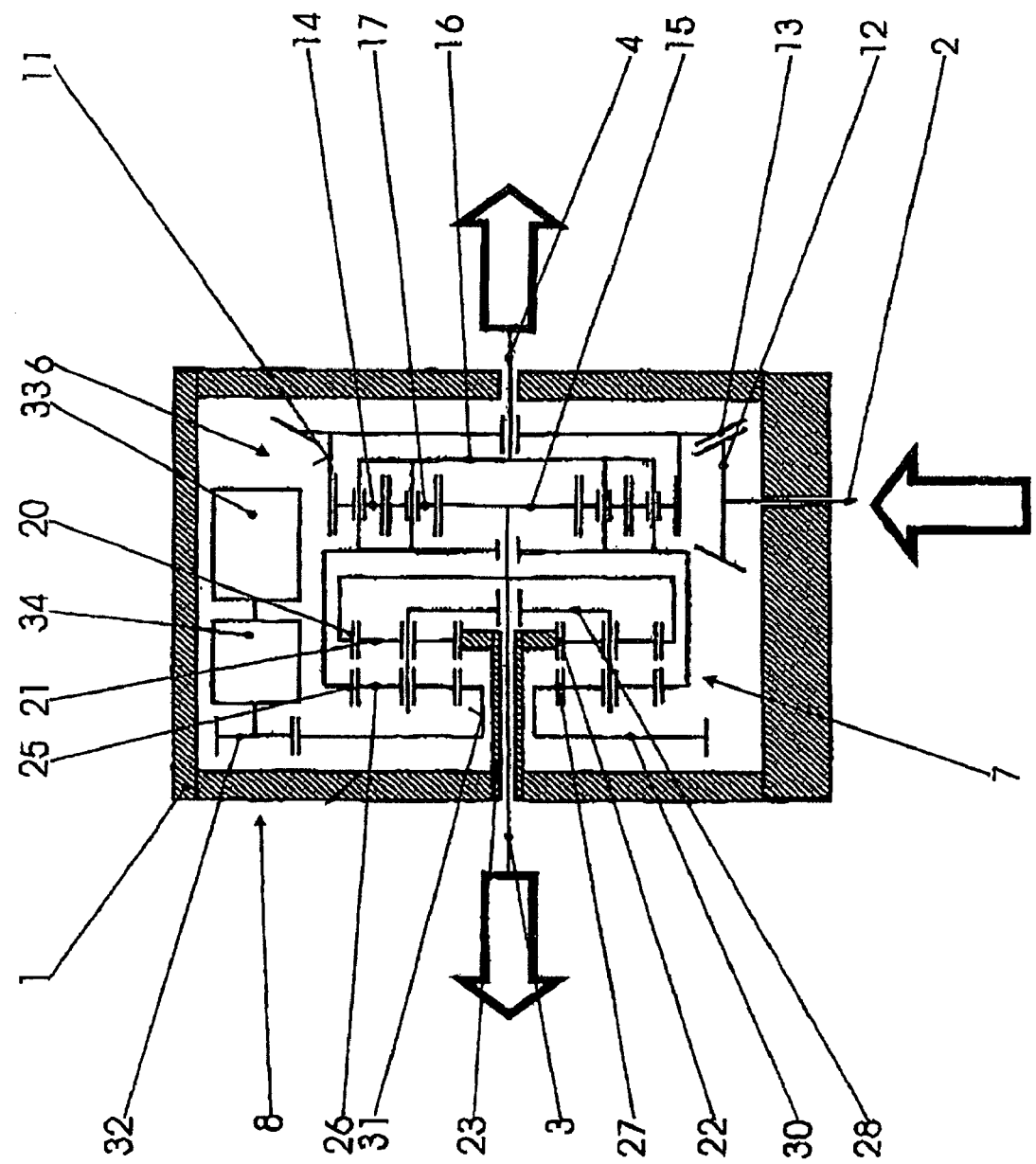
FIG..1

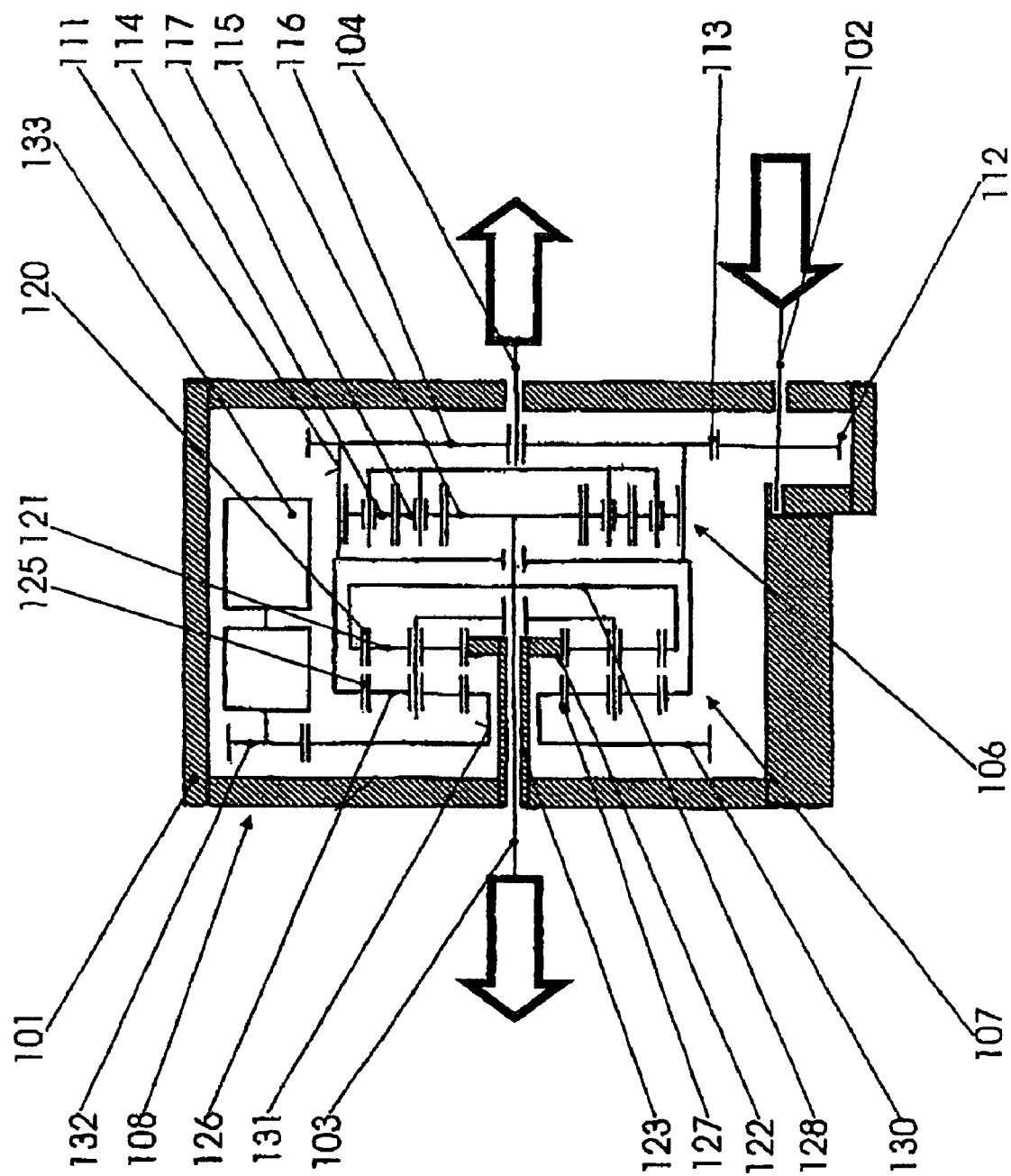
FIG..2

DIFFERENTIAL GEAR UNIT WITH CONTROLLABLE TORQUE AND ROTATIONAL SPEED DISTRIBUTION

BACKGROUND OF THE INVENTION

The invention relates to a differential gearing unit with controllable torque and rotational speed distribution, composed of a housing, a differential gearing, a superposition gearing and an auxiliary drive, with the differential gearing comprising an input member which is driven by the vehicle engine, and two output members with output shafts, and with the superposition gearing being a planetary gear set which is connected to two members of the differential gearing and to the auxiliary drive and furthermore with the superposition gearing comprising a first and a second sun gear, a first and a second ring gear and first and second planet gears, and the first and second planet gears meshing in each case with the first and second sun gear respectively and with the first and second ring gear respectively.

A differential gearing equalizes rotational speed differences between the two output shafts, with the distribution of the torques resulting from the geometry. A differential gearing unit according to the above definition additionally makes it possible to influence the torque distribution in a targeted fashion. This is done by imposing a relatively small speed difference on the two output shafts. It is thus possible, for example in an application as an axle differential, to supply additional drive force to the faster-rotating wheel at the outside of the curve, or in an application as a central differential, to adjust the torque between the two driven axles. The driving dynamics of the vehicle are influenced in this way. This is therefore also referred to as "torque vectoring".

Differential gearing units of said type can be arranged both as axle differentials, that is to say between the wheels of an axle, or as inter-axle differentials, that is to say between two driven axles. The additional drive force is either branched off at a suitable point upstream in the force flow or is provided by an auxiliary drive. In the latter case, it is desirable for reasons of energy balance and wear for the auxiliary drive to be at standstill when the two drive output shafts are at the same rotational speeds. In addition, in view of the driving-dynamic action of an engagement of said type, the drive force applied by the auxiliary drive must be very precisely controllable.

A differential gearing unit of said type is known from U.S. Pat. No. 5,387,161. In said axle differential unit, the superposition gearing is a single planetary gear set whose planet carrier is rotationally fixedly connected to the auxiliary drive and whose ring gear is drive-connected, by means of a fixed-axle step-up stage, to the planet carrier of the differential gearing, which is likewise embodied as a planetary gear set, and therefore to the other output shaft. A disadvantage thereof is firstly that the auxiliary drive does not act exclusively on the one output shaft. This causes complex torque ratios which make precise control of the auxiliary drive difficult. When driving in a straight line, although the auxiliary drive is at standstill, extremely high rotational speeds are generated in the coupling to the differential gearing. In addition, the auxiliary drive requires considerable engine power for an effective engagement. The overall arrangement is heavy, cumbersome and structurally complex.

WO 03/066363 A1 discloses a generic differential gearing unit which is used as an inter-axle differential and has a superposition gearing for influencing the torque distribution. Said superposition gearing is however designed with a transmission ratio nonconformity, so that, despite the two drive output shafts being at the same rotational speed, the auxiliary drive must operate in order to equalize the transmission ratio nonconformity. This results, in addition to increased wear and energy consumption, in a higher power requirement of the auxiliary drive, because the latter must output the torque which is to be introduced at a higher rotational speed.

SUMMARY OF THE INVENTION

It is therefore the object on which the invention is based to provide a generic differential gearing unit which, while being of low weight and having low space and energy requirements, permits precise control with a low-power auxiliary drive. This is provided according to the invention in that the first and second planet gears are arranged on a common planet carrier, and in that, in the superposition gearing, the first sun gear is rotationally fixedly connected to the housing of the differential gearing unit, the second sun gear is driven by the auxiliary drive, and the first ring gear is rotationally fixedly connected to an output shaft.

A superposition gearing of a design of said type does not call upon the auxiliary drive when the two output shafts are at the same rotational speed. Said auxiliary drive can therefore be at standstill in normal operation and requires no energy. Furthermore, this results in clear kinematic relationships, which benefits precise control. In this way, the differential gearing unit according to the invention can be used in an unrestricted manner both as an axle differential and also as an inter-axle differential (or central differential).

With a planetary gear set of said type, it is possible to provide a high transmission ratio for the auxiliary drive, and the functionality is independent of the vehicle speed, which results in a relatively simple and very fine control. As a further result, the auxiliary drive only absorbs a small amount of power, which also benefits the installation size. Since it is the vehicle dynamics which are being controlled, that is to say when traveling at (high) road speed, the control range need not be very wide.

It is finally the case in said arrangement that the tangential forces to be withstood by the planet gears are very small, so that the two planet sets can be designed to be very small. As a result, the entire differential gearing unit is only an insignificant amount larger than a conventional differential gearing. Furthermore, it is possible in this way to select the number of teeth of the gearwheels of the two planet stages to be in each case identical, which permits—in a cost-reducing manner—an increased number of identical parts.

There are two advantageous paths for the connection between the differential gearing and the superposition gearing. One path leads from the second ring gear via a rotationally fixed connection to the output member of the differential gearing and therefore to an output shaft; the other path leads from the second ring gear via a rotationally fixed connection to the input member of the differential gearing. Which is to be used is dependent on the vehicle-specific design.

One particularly favorable arrangement of the auxiliary drive and the bearing of the concentric shafts is made possible if the second sun gear is seated on a hollow shaft which surrounds the rotationally fixed connection between the first sun gear and the housing, which hollow shaft is drive-connected to the auxiliary drive.

The auxiliary drive can be of any desired type as long as it permits tractive and braking operation in a controllable fashion in both rotational directions. Said auxiliary drive is preferably a controllable electric motor with a step-down gearing. Its installation, power supply and connection to a control unit accommodated elsewhere are thus particularly simple.

BRIEF DESCRIPTION OF THE DRAWINGS

The invention is described and explained in the following on the basis of schematic figures, in which:

FIG. 1 shows a first embodiment,
FIG. 2 shows a second embodiment.

DETAILED DESCRIPTION

The entire differential gearing unit is situated in a housing 1 which is fixed to the vehicle. The drive force for the vehicle is provided via a drive input shaft 2 either directly or indirectly from an engine-transmission unit (not illustrated), depending on the arrangement of the drivetrain and on whether the differential gearing unit is an axle differential or an inter-axle differential. A first output shaft 3 and a second output shaft 4 are guided out of the housing 1 at opposite sides. Said output shafts are either axle shafts which lead to the wheels of an axle or shafts which lead to two driven axles. A differential gearing 6, a superposition gearing 7 and a controllable auxiliary drive 8 are in the interior of the housing.

The differential gearing 6 is a planetary gear set. The latter is composed of a ring gear 11 as simultaneously an input member and differential housing with a large wheel 13 which surrounds it and which is driven by a pinion 12 seated on the drive input shaft 2; of first and second planet gears 14, 17 which are rotatably mounted on a planet carrier 16; and of a sun gear 15. The sun gear 15 is rotationally fixedly connected to the first output shaft 3, and the planet carrier 16 is rotationally fixedly connected to the second output shaft 4.

The superposition gearing 7 is a double planetary gear set with two planet sets adjacent to one another. A first ring gear 20 of the first stage meshes with first planet gears 21 which in turn mesh with a first sun gear 22. The first ring gear 20 is rotationally fixedly connected to the first output shaft 3 and therefore to the sun gear 15 of the differential gearing 6. The sun gear 22 is rotationally fixedly connected by means of a tube 23 to the housing 1, and is therefore always stationary. A second ring gear 25 meshes with second planet gears 26 which in turn mesh again with a second sun gear 27. The planet gears 21, 26 of the two stages are rotatably mounted on a planet carrier 28 which itself is mounted so as to be freely rotatable on the first output shaft 3.

The second sun gear 27 is part of a hollow shaft 31 to which the input gearwheel 30 of the auxiliary drive 8 is rotationally fixedly connected. The auxiliary drive is composed here of an electric motor 33, which is controllable in all four quadrants of its characteristic diagram, and a step-down transmission 34, from which the controllable auxiliary torque is transmitted via a gearwheel 32 to the input gearwheel 30 of the additional drive 8.

In operation, the described arrangement operates as follows: during slip-free straight-line travel of the vehicle, in which the two output shafts 3, 4 rotate at the same speed and the differential gearing 6 thus rotates as a block, the two ring gears 20, 25 of the superposition gearing 7 rotate at the same speed. If, in said operating state, no torque is to be superposed at one side, the auxiliary drive 8 is at standstill. The two sun gears 22, 27 are therefore at standstill. The two planet gear sets roll freely between their respective ring and sun gears.

If the auxiliary drive 8 is to accelerate the first output shaft 3 by supplying a torque, or if, in other words, said auxiliary drive 8 is to provide a higher torque by increasing the rotational speed, this is done via the second sun gear 27; the latter thus rotates relative to the spatially fixed first sun gear 22. The resulting faster rotational movement of the second planet gears 6, and with the latter, of the common planet carrier 28, results in a higher rotational speed of the first planet gears 21 and therefore also of the first output shaft 3.

If the second output shaft is to be accelerated, the auxiliary drive 8 is set in motion in the opposite direction. The superposition gearing behaves in a similar way. As a result, the first output shaft 3 is decelerated, which, as a result of the action of the differential gearing 6, leads to a higher rotational speed of the second output shaft 4.

The embodiment of FIG. 2, in which corresponding reference numbers are increased by 100, differs from this in that the second ring gear 125 is rotationally fixedly connected not to the planet carrier 16 but to the input member 111 of the differential gearing 106. Furthermore, instead of an electric motor 33 with a step-down transmission 34, a hydraulic motor 133 is installed, and instead of a drive pinion 12 and a plate gear 13, spur gears 112, 113 are provided, which is for example the case in an application as a central differential.

The invention claimed is:

1. A differential gearing unit with controllable torque and rotational speed distribution, composed of a housing, a differential gearing, a superposition gearing and an auxiliary drive, with the differential gearing comprising an input member which is driven by a vehicle engine, and two output members with output shafts, and with the superposition gearing being a planetary gear set which is connected to two members of the differential gearing and to the auxiliary drive, characterized in that the superposition gearing comprising a first and a second sun gear, a first and a second ring gear and first and second planet gears on a common planet carrier, with the first and second planet gears meshing in each case with the first and second sun gear respectively and with the first and second ring gear respectively.

2. The differential gearing unit as claimed in claim 1, characterized in that, in the superposition gearing, the first sun gear is rotationally fixedly connected to the housing of the differential gearing unit, the second sun gear is driven by the auxiliary drive, the second ring gear is rotationally fixedly connected to the input member of the differential gearing, and the first ring gear is rotationally fixedly connected to the related output shaft.

3. The differential gearing unit as claimed in claim 1, characterized in that, in the superposition gearing, the first sun gear is rotationally fixedly connected to the housing of the differential gearing unit, the second sun gear is driven by the auxiliary drive, the second ring gear is rotationally fixedly connected to the output member of the differential gearing and to an output shaft, and the first ring gear is rotationally fixedly connected to the other output shaft.

4. The differential gearing unit as claimed in claim 2 or 3, characterized in that the first and second sun gear, the first and second planet gears and the first and second ring gear in each case have the same number of teeth, and in that the common planet carrier is freely rotatable.

5. The differential gearing unit as claimed in claim 1, characterized in that, in the superposition gearing, the second sun gear is seated in a rotationally fixed manner on a hollow shaft which surrounds the rotationally fixed connection between the first sun gear and the housing, which hollow shaft is drive-connected to the auxiliary drive.

6. The differential gearing unit as claimed in claim 1, characterized in that the auxiliary drive is a controllable electric motor with a step-down gearing.

7. The differential gearing unit as claimed in claim 1, characterized in that the differential gearing unit is a planetary gear set, whose input member which is driven by the vehicle engine is the ring gear, and whose output members are the planet carrier and the sun gear, which output members are in each case rotationally fixedly connected to an output shaft (3,4;103,104).

8. The differential gearing unit as claimed in claim 7, characterized in that the planet carrier has first and second planet gears, with the first planet gears meshing with the ring gear and the second planet gears and the second planet gears in turn meshing with the sun gear.

* * * * *